June 12, 1962  T. A. SEEGRIST  3,038,617
BOAT TRAILER
Filed Dec. 23, 1960  3 Sheets-Sheet 1
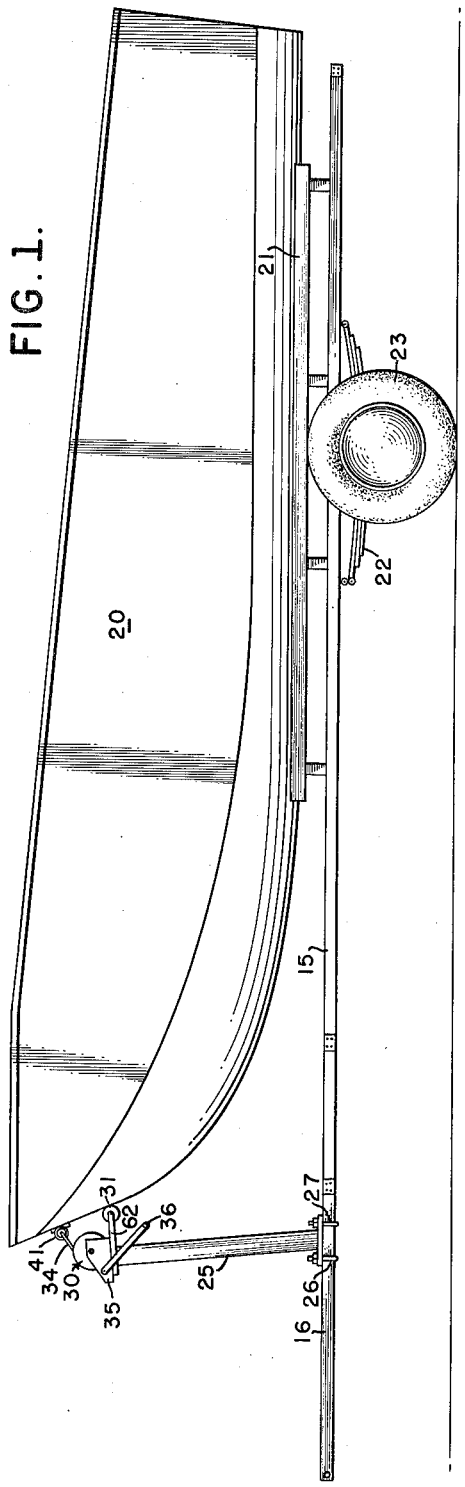
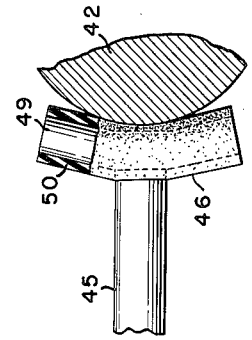
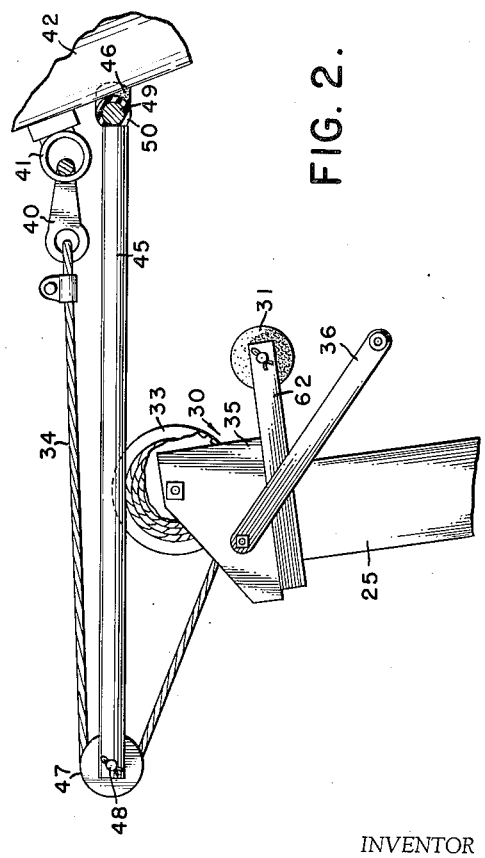
INVENTOR
T. A. Seegrist June 12, 1962

T. A. SEEGRIST 3,038,617

BOAT TRAILER

Filed Dec. 23, 1960

INVENTOR

T. A. Seegrist

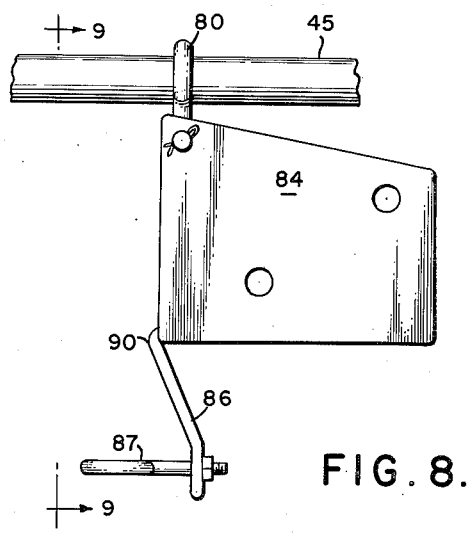
FIG. 8.
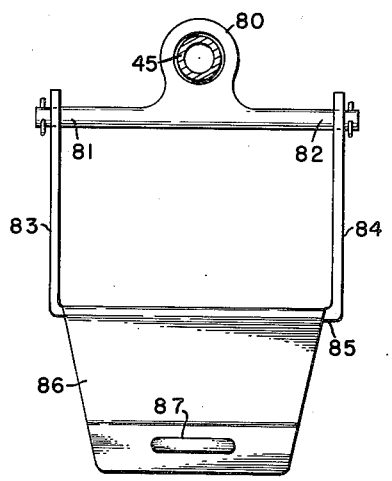
FIG. 9.
FIG. 10.
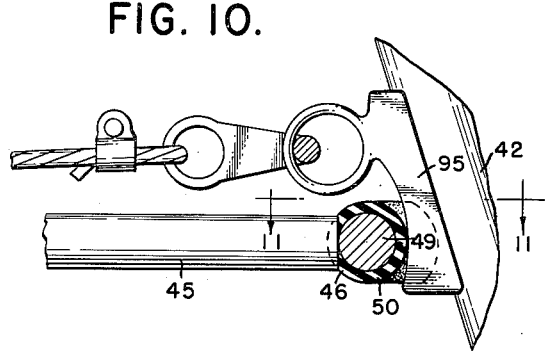
FIG. 11.
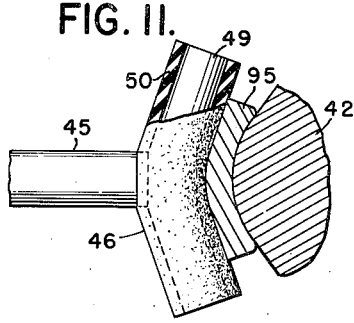
FIG. 7.
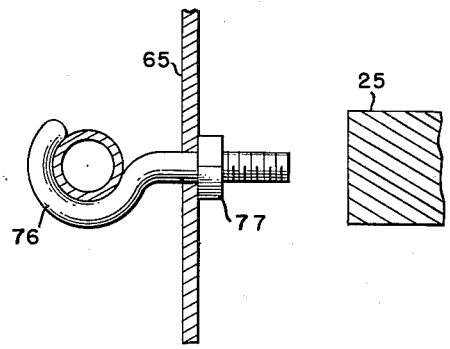
INVENTOR
T. A. Seegrist

United States Patent Office 3,038,617
Patented June 12, 1962

3,038,617
BOAT TRAILER
Theodore A. Seegrist, P.O. Box 223, McLean, Va.
Filed Dec. 23, 1960, Ser. No. 78,082
4 Claims. (Cl. 214—85.5)

This invention relates to a boat trailer, especially of the type used to trailer a light weight boat by automobile for pleasure purposes.

This type of trailer is normally equipped with a winch for hand pulling the boat from the water onto the trailer. However, unloading the boat depends on inclining the trailer boat-bed toward the water so that the boat slides or rolls by gravity from the boat-bed on rails or rollers fixed to the trailer. Trailers may be equipped with tilt-beds to aid in increasing the incline and if a suitable ramp or ideal shore line is available, little difficulty in unloading the boat is encountered by an experienced operator.

Frequently, it is desired to launch a boat on a shore line not having a good launching site and difficulty is encountered in forcing the boat to move rearward on its bed, especially if one is using a trailer not provided with a tilt-bed.

The non-tilt-bed type trailer is preferable in many respects. It is of simpler construction, less costly, less difficult to maintain, and of a more rigid structure.

The boat-bed of the non-tilt-bed type trailer is rigidly fixed to the trailer frame which rides on a single transverse axis supported on the wheels. To tilt the boat-bed it is necessary to raise the frame at the front by lifting the tongue thus to pivot the frame about the axis. Since the center of gravity of the boat and frame is located forward of the axis so as to weight the trailer tongue downward onto the car hitch, simultaneously lifting the tongue, starting the boat to slide backward, and handling the winch crank or winch brake may be a dangerous operation. At the least it is arduous and tends to detract from the pleasure of boating.

The present invention provides a simple pushing structure by virtue of which the same winch that is used to pull the boat onto the trailer is also used to force the boat to move rearwardly on the trailer. Thus when it is desired to launch the boat, the boat is readily moved to a position at which the center of gravity is located such that the trailer tongue can be more easily lifted.

For a description of the invention in detail, reference is made to the accompanying drawing in which parts in some instances are shown broken away, are in section, or are omitted.

In the drawing:

FIG. 1 is a side elevation of a boat loaded on a conventional non-tilt-bed type trailer;

FIG. 2 is a side elevation enlarged over the showing in FIG. 1 of the boat trailer winch and the pushing structure in position for forcing the boat to move rearwardly;

FIG. 6 is a view on line 6—6 of FIG. 3;

FIG. 7 is a view on line 7—7 of FIG. 5;

FIG. 8 is a side elevation of an embodiment in which the winch frame is modified to provide means for carrying the pushing structure;

FIG. 9 is a view on line 9—9 of FIG. 8;

FIG. 10 shows a modified pull-eye anchored in the prow of the boat; and

FIG. 11 is a view on line 11—11 of FIG. 10.

Figure 3:
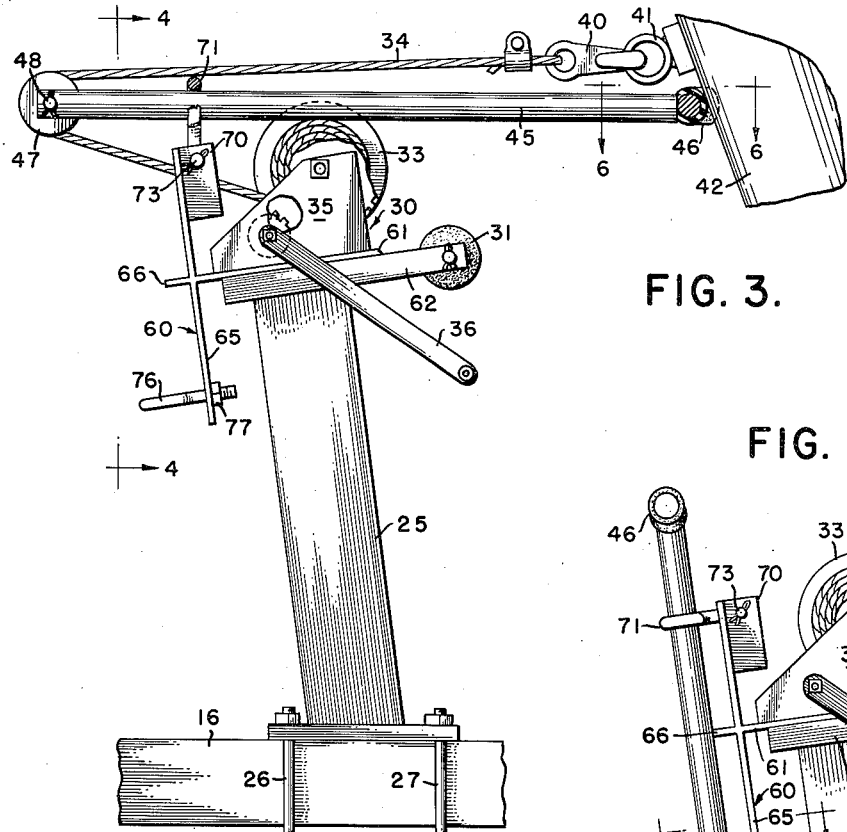
FIG. 3 is a side elevation of the boat trailer winch and pushing structure similar to the showing of FIG. 2, except that in this embodiment means is provided to carry the pushing structure in position for handy use.

Referring to FIG. 1, a usual non-tilt-bed type trailer is shown provided with a frame 15 having a tongue 16 provided at its forward end with a conventional type car hitch, not shown. The boat 20 rides on boat-bed 21 fixed to the frame. The frame is supported on a leaf spring at each side, the springs being supported on a single transverse axle carrying a pneumatic tired wheel at each side. One leaf spring 22 and one wheel 23 are illustrated at the near side of FIG. 1, it being understood that the opposite side is similar. The axle is not shown.

Standard 25 is attached to the tongue with U-clamps 26 and 27 so as to be adjustable forwards or backwards for properly locating the center of gravity of the loaded trailer.

The winch 30 is mounted on top of the standard. A usual type buffer 31 is also provided against which the prow of the boat is engaged when the boat is in position on the trailer for hauling.

The winch 30 is provided with a spool 33 on which the pull-strand 34, such as a flexible steel cable or a rope, is wound. The spool is rotatably supported on the winch frame 35 which also supports the hand crank 36 suitably geared to the spool with a reduction gearing (not illustrated in FIG. 2). Winches of this type are also provided with locking latches or brakes, but such conventional parts are not shown in the accompanying drawing.

The free end of the pull-strand is provided with a hook 40 adapted to engage the pull-eye 41 which is anchored in the boat prow 42, thus to attach the free end of the pull-strand to the pull-eye. In normal use for pulling the boat onto the trailer, the hook 40 is engaged in the pull-eye and the winch is operated to wind the pull-strand onto the spool.

The pushing structure is provided with a thrust-rod 45 having a boat-engaging head 46 at its forward end and a sheave 47 rotatably mounted on pin 48 at its rearward end. The boat-engaging head is formed from a short bar 49 welded to the end of the thrust-rod and covered with a suitable material 50, such as rubber, to prevent marring the boat, the bar being curved similar to the curve of the boat prow.

To explain use of the pushing structure, assume the boat is in position as illustrated in FIG. 1. The winch brake is first disengaged and the winch handle turned to provide slack in the pull-strand. The pushing structure is set in position with the boat-engaging head in engagement with the boat prow immediately beneath the pull-eye and with the thrust rod mounted above the winch spool and lying on the part of the pull-strand which is wound on the winch spool. The slack portion of the pull-strand is looped over the sheave with the free end of the pull-strand attached to the pull-eye. Turning the winch handle to wind the pull-strand onto the spool tightens the strand thus forcing the boat to move rearwardly. FIG. 2 shows the boat moved to the rear an amount about one-half the distance provided by the length shown for the pushing structure.

Although the pushing structure can be made of any desired length, an overall length of from 2 to 3 feet is satisfactory for most pleasure boats and trailers.

While in operation moving the boat rearwardly, the thrust-rod stays nicely in position without being touched. It is held at its intermediate portion slidingly on the wound up part of the strand on the winch spool.

Referring to the embodiment shown in FIGS. 3, 4, 5, 6, and 7, the tongue 16, standard 25, U-clamps 26 and 27, winch 30, buffer 31, spool 33, pull-strand 34, winch frame 35, hand crank 36, hook 40, pull-eye 41, boat-prow 42, thrust rod 45, boat-engaging head 46, sheave 47, bar 49, and material 50 are similar in structure and function to the same numbered parts before described. However, this embodiment is provided with a bracket 60 mounting the pushing structure in a handy carrying position out of the way of the pull-strand.

Bracket 60 is provided with a rearwardly extending plate 61 mounted immediately above the buffer frame 62 and below the bottom plate 63 of the winch frame. The same bolts, one of which is shown at 64, are used to secure the winch and bracket 60 on top of the standard 25.

The forward edge of plate 61 has an integral upwardly extending plate 65 which carries on its forward face a fulcrum ledge 66. Plate 65 has a cut out portion at its top and is provided with two rearwardly extending wings 69 and 70. A ring 71 through which thrust rod 45 slides is provided with oppositely directed laterally extending pins 72 and 73 pivotally mounted relative to the winch in apertures provided in the wings 69 and 70. With ring 71 pivoted to its upright position, the thrust-rod 45 may be set in position for pushing the boat rearwardly on the trailer as illustrated in FIG. 3.

Figure 5:
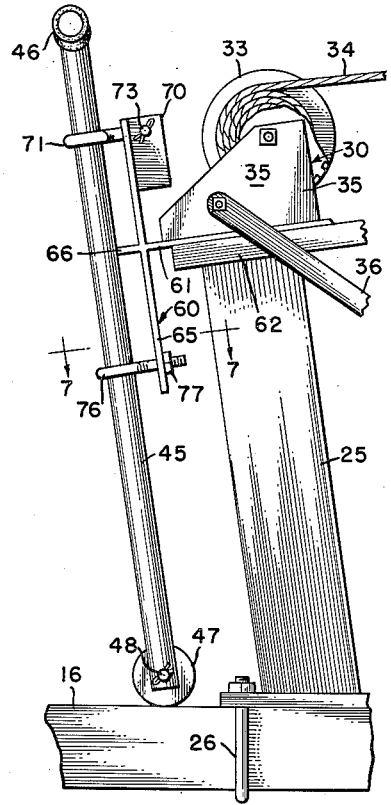
FIG. 5 is a side elevation of the same embodiment shown in FIG. 3, but showing the pushing structure carried in its non-use position.
Figure 4:
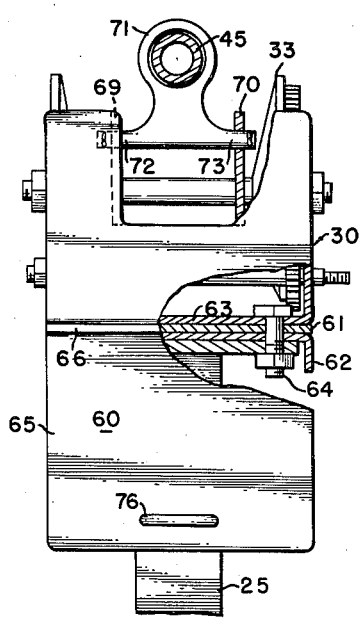
FIG. 4 is a view on line 4—4 of FIG. 3.

When the pushing structure is not in use the thrust-rod 45 is swung over to the setting shown in FIG. 5, the ring 71 assuming the position shown. A hook bolt 76 is mounted in an aperture near the lower end of plate 65. It is hooked over thrust-rod 45 and the nut 77 is tightened thus to draw the thrust-rod tightly against fulcrum ledge 66 and lock the pushing structure securely in its carrying position.

To use the pushing structure of this embodiment, assume the parts are in position as illustrated in FIG. 5. The hook 40 is first unhooked from eye 41, the thrust-rod 45 is loosened from hook bolt 76, and the thrust-rod is swung into its operative setting. The end of the pull strand carrying the hook is passed through the cut out in plate 65 between the wings 69 and 70 and under the ring 71, and is threaded over the sheave 47. The hook 40 is then rehooked in eye 41. The parts are now in proper position to tighten the strand on the winch spool to push the boat rearwardly as illustrated in FIG. 3.

In the embodiment illustrated in FIGS. 8 and 9, the frame of the winch is itself constructed to provide the means for carrying the pushing structure. Only the winch frame is illustrated in FIGS. 8 and 9, since the other parts of the winch are the same as those of the previously described embodiments.

In this embodiment, the ring 80 through which the thrust-rod 45 passes is pivotally mounted relative to the winch by oppositely directed laterally extending pins 81 and 82 pivoted in suitable apertures provided in the side plates 83 and 84 of the winch frame. The bottom plate 85 of the winch frame is provided with an integral downwardly extending and rearwardly inclined lip 86 carrying near its bottom portion a hook bolt 87 the same in structure and function as hook bolt 76 previously described. The knee 90 in this embodiment functions as the fulcrum ledge as previously described in reference to fulcrum ledge 66.

FIGS. 10 and 11 illustrate a modified structure for the pull-eye. In this instance the pull-eye has an integral downwardly extending buffer plate 95 against which the head 46 of thrust-rod 45 engages when the boat is being pushed rearwardly. This structure provides for removing all strain tending to pull the eye from its anchorage in the boat prow 42 while the boat is being forced rearwardly. It also provides a metal seat for the boat engaging head. The pull-eye is normally anchored to the back by an integral bolt extending through the prow 42 into the forward hold of the boat.

I claim:

1. The combination with a non-tilt-bed type boat trailer having a winch provided with a spool and a pull-strand wound thereon for hand pulling a boat from the water onto the trailer, the boat having a pull-eye anchored in its prow, of a pushing structure provided with a thrust-rod having a boat-engaging head on one end and a sheave rotatably mounted on its other end, the thrust-rod being mountable above the winch spool with its boat-engaging head in engagement with the prow of a boat on the trailer beneath the pull-eye, with the pull-strand wound on the winch spool and looped over the sheave, and with the free end of the pull-strand attached to the pull-eye, whereby winding of the pull-strand onto the winch spool forces the boat to move rearwardly on the trailer.

2. The combination with a winch for a boat trailer, the winch being provided with a spool and a pull-strand wound thereon for hand pulling a boat from the water onto the trailer, of a pushing structure provided with a thrust-rod having a boat-engaging head on one end and a sheave rotatably mounted on its other end, the thrust-rod being mountable above the winch spool with its boat-engaging head in engagement with the prow of a boat on the trailer, with the pull-strand wound on the winch spool and looped over the sheave, and with the free end of the pull-strand attachable to a pull-eye of the boat, whereby the pull-strand may be wound onto the winch spool to force the boat to move rearwardly on the trailer.

3. A boat trailer winch provided with a spool and a pull-strand wound thereon for hand pulling a boat from the water onto the trailer, a pushing structure provided with a thrust-rod having a boat-engaging head on one end and a sheave rotatably mounted on its other end, and a ring through which the thrust-rod slides, the ring being pivotally mounted relative to the winch, whereby in one position of the ring the thrust-rod may be set above the winch spool with its boat-engaging head in engagement with the prow of a boat on the trailer, with the pull-strand wound on the winch spool and looped over the sheave, and with the free end of the pull-strand attached to a pull-eye of the boat, in which setting of the thrust-rod the pull-strand may be wound onto the winch spool to force the boat to move rearwardly of the trailer, and in another position of the ring the thrust-rod may be set in a carrying position out of the way of the pull-strand, in which setting of the thrust-rod the pull-strand may be wound onto the winch spool to pull the boat onto the trailer.

4. A boat trailer winch provided with a spool and a pull-strand wound thereon for hand pulling a boat from the water onto the trailer, a pushing structure provided with a thrust-rod having a boat-engaging head on one end and a sheave rotatably mounted on its other end, and means mounting the pushing structure relative to the winch such that the pushing structure may be set in one position with the thrust-rod above the winch spool with its boat-engaging head in engagement with the prow of the boat on the trailer, with the pull-strand wound on the winch spool and looped over the sheave, and with the free end of the pull-strand attached to a pull-eye of the boat, in which setting of the thrust-rod the pull-strand may be wound onto the winch spool to force the boat to move rearwardly of the trailer, and such that the pushing structure may be set in another position with the thrust-rod in a carrying position out of the way of the pull-strand, in which setting of the thrust-rod the pull-strand may be wound onto the winch spool to pull the boat onto the trailer.

References Cited in the file of this patent

UNITED STATES PATENTS

| | | |
|---|---|---|
| 881,280 | Andersen et al. | Mar. 10, 1908 |
| 2,128,240 | Foster | Aug. 30, 1938 |
| 2,137,743 | Strassman | Nov. 22, 1938 |
| 2,514,752 | Faulkner et al. | July 11, 1950 |
| 2,852,152 | Rosselle | Sept. 16, 1958 |